US012559184B2

(12) United States Patent
Terada et al.

(10) Patent No.: US 12,559,184 B2
(45) Date of Patent: Feb. 24, 2026

(54) CRAWLER UNIT AND TROLLEY FOR BAD ROAD USING THE SAME

(71) Applicant: YAZAKI KAKO CORPORATION, Shizuoka (JP)

(72) Inventors: Takeru Terada, Shizuoka (JP); Takuya Nagano, Shizuoka (JP); Mitsuo Yazaki, Shizuoka (JP)

(73) Assignee: YAZAKI KAKO CORPORATION, Shizuoka (JP)

( * ) Notice: Subject to any disclaimer, the term of this patent is extended or adjusted under 35 U.S.C. 154(b) by 562 days.

(21) Appl. No.: 17/923,785

(22) PCT Filed: Sep. 6, 2021

(86) PCT No.: PCT/JP2021/032654
§ 371 (c)(1),
(2) Date: Nov. 7, 2022

(87) PCT Pub. No.: WO2022/070790
PCT Pub. Date: Apr. 7, 2022

(65) Prior Publication Data
US 2023/0174175 A1     Jun. 8, 2023

(30) Foreign Application Priority Data
Sep. 29, 2020    (JP) ................................ 2020-163702

(51) Int. Cl.
 B62D 55/084      (2006.01)
 B62D 55/10       (2006.01)
 (Continued)

(52) U.S. Cl.
 CPC ......... B62D 55/0847 (2013.01); B62D 55/10 (2013.01); B62D 55/14 (2013.01);
 (Continued)

(58) Field of Classification Search
 CPC .. B62D 55/253; B62D 55/0847; B62D 55/10; B62D 55/18; B62D 55/24; B62D 55/06
 See application file for complete search history.

(56) References Cited

U.S. PATENT DOCUMENTS 1,318,188 A * 10/1919 Tritton ............... B62D 55/0845
                                                    305/109
3,221,830 A * 12/1965 Walsh .................... B62D 55/07
                                                    180/9.62
(Continued)

FOREIGN PATENT DOCUMENTS

JP       2000-072053 A      3/2000
JP       2002-002564 A      1/2002
(Continued)

OTHER PUBLICATIONS

PCT/ISA/210, "International Search Report for PCT International Application No. PCT/JP2021/032654," Oct. 12, 2021.

*Primary Examiner* — Kip T Kotter
(74) *Attorney, Agent, or Firm* — HAUPTMAN HAM, LLP

(57) ABSTRACT

Provided is a lightweight crawler unit which is capable of swiveling, suitable for a trolley for bad roads, and used for transportation in muddy places such as snowy roads, sandy ground, and fields, and disaster sites. A crawler includes a plurality of inner attachments provided inside thereof toward a frame to have a band-shape, overhang edges 70 protruding in a left and right direction of a rail provided on a circumference of the frame, and overhang edges 34 protruding in a left and right direction of each of the inner attachments, in a space K enclosed between the overhang edges 34 facing each other, the overhang edges 70 are inserted, the overhang edges 34, 70 are set in a positional relation in which they overlap with each other in an up and down direction, and the
(Continued)

crawler circulates around pulleys, while the inner attach-ments are restricted along the rail.

5 Claims, 14 Drawing Sheets

(51) Int. Cl.
*B62D 55/14*            (2006.01)
*B62D 55/253*          (2006.01)
*B62B 11/00*            (2006.01)
(52) U.S. Cl.
CPC ............ *B62D 55/253* (2013.01); *B62B 11/00* (2013.01); *B62B 2301/256* (2013.01)

(56)                    References Cited

U.S. PATENT DOCUMENTS

| | | | | |
|---|---|---|---|---|
| 3,879,092 | A * | 4/1975 | Rose ....................... | B62M 27/02 |
| | | | | 180/193 |
| 4,433,634 | A * | 2/1984 | Coast .................... | B60F 3/0061 |
| | | | | 180/9.1 |
| 2002/0047306 | A1 | 4/2002 | Watanabe et al. | |
| 2008/0284244 | A1 * | 11/2008 | Hirose ................... | B62D 55/00 |
| | | | | 305/165 |
| 2012/0111649 | A1 * | 5/2012 | Beard ................. | B62D 55/108 |
| | | | | 180/9 |

FOREIGN PATENT DOCUMENTS

| | | | |
|---|---|---|---|
| JP | 3322358 | B2 * | 9/2002 |
| JP | 5806370 | B1 | 11/2015 |
| JP | 2019-142485 | A | 8/2019 |

* cited by examiner

Fig. 7(A)                    Fig. 7(B)

CRAWLER UNIT AND TROLLEY FOR BAD ROAD USING THE SAME

RELATED APPLICATIONS

The present application is National Phase of International Application No. PCT/JP2021/032654 filed Sep. 6, 2021, and claims priority from Japanese Application No. 2020-163702, filed Sep. 29, 2020, the disclosures of which are hereby incorporated by reference herein in its entirety.

TECHNICAL FIELD

The present invention relates to the technical field of crawler units and trolleys for bad roads using the same, and more specifically, relates to trolleys for bad roads with lightweight crawler units capable of swiveling, which are used for transportation especially in bad road surface environments, for example, muddy places such as snowy roads, sandy ground, and fields, and disaster sites suffered from such as earthquakes or floods.

BACKGROUND ART

As crawler units of this type, for example, Patent Literature 1 discloses an endless crawler rotatably driven by a sprocket, comprising: a plurality of track shoes provided side by side in a direction of rotation; a plurality of bendable hinge portions formed thinner than the track shoes and connecting the adjacent track shoes; and a plurality of engagement recesses provided in the hinge portions by cutting regions located at both sides in a width direction of each of the hinge portions so as to receive teeth of the sprocket, wherein the track shoes and the hinge portions are integrally formed of synthetic resin, and the width dimension of the hinge portions is less than that of the track shoes due to formation of the engagement recesses (see claim 1 of Patent Literature 1).

Patent Literature 1 teaches, in paragraph [0039], that a drive mechanism 34 comprises an electric motor 51 driven by electric power supplied from a battery 5, a pulley 52 fixed coaxially to a shaft portion 32b of a drive side sprocket 32, and a belt 53 stretched between a shaft 51a of the motor 51 and the pulley 52. Driving the motor 51 generates the driving force, and the driving force of the motor 51 is transmitted to the pulley 52 via the belt 53, thereby driving and rotating the drive side sprocket 32 integrally with the pulley 52. Paragraph [0039] also teaches that a driven side sprocket 33 is synchronously driven and rotated via a crawler 30 which is fed and driven by the driven side sprocket 32.

Furthermore, as disclosed in Patent Literature 2, the Applicant has developed a crawler unit comprising a crawler circulating around a plurality of pulleys, wherein the crawler includes a plurality of band-shaped outer attachments provided around an outer circumference thereof, one of the front and rear surfaces of the adjacent outer attachments is provided with a restriction recess while the other surface is provided with a restriction protrusion, and when the restriction protrusion enters the restriction recess, the outer attachments are positioned and restricted (see claim 1 of Patent Literature 2).

Furthermore, paragraph [0020] of Patent Literature 2 discloses that an interval between side portions 24, 24 protruding at both sides is set to a width dimension W which accommodates a pulley 6 attached to a main body of the crawler unit 5 and allows the pulley 6 to sufficiently rotate therein, and the side portions 24, 24 surround the side faces of the pulley 6. The outer attachments 2 (crawler 1) circulate around the pulley 6 while surrounding the side faces of the pulley 6, thereby preventing the crawler 1 from easily being detached from the pulley 6 even if receiving a lateral force when swiveling, whereas the pulley 6 is allowed to rotate with being in contact with an outer recess portion 25 of a base portion 20 near the side portions 24 of each of the outer attachments 2.

CITATION LIST

Patent Literature

Patent Literature 1: JP-B-5806370
Patent Literature 2: JP-A-2019-142485

SUMMARY OF INVENTION

Technical Problem

The crawler according to Patent Literature 1 has a mechanism in which engagement between the sprocket 32 driven by the pulley 52 and the belt 53 provided with grooves and holes in itself prevents detachment of the belt 53. In the case of the crawler having such a mechanism, a lot of processes for providing a belt of the crawler with grooves and holes are involved, and thus it is necessary for the belt to have enough strength. This increases the thickness and weight of the belt.

Furthermore, it is difficult to adopt the mechanism according to Patent Literature 1 to manual crawlers because it assumes tensioning of the belt of the crawler in order to make the crawler circulate, which results in high transport load, poor circulation of the crawler, and heavy travel on the trolley. In Patent Literature 2 of the Applicant, the crawler 1 is tensioned by extending the distance between the pulleys 6 provided at both ends more than the crawler 1. Reducing the tension of the crawler causes smoother and lighter circulation of the crawler, thereby further improving traveling performance. Development of such crawler units has been expected.

In view of the circumstances of the prior art, objects of the present invention are as follow.

(1) A rail (overhang edges) is provided only on a ground contact portion of the main frame, and receiving portions (overhang edges) are provided on the crawler (inner attachments) where the rail passes.

(2) A space (clearance) is provided between the rail and the receiving overhang edges so that the rail and the inner attachment do not touch each other to prevent generation of the resistance.

(3) The rail and the inner attachments interfere with each other only when the crawler unit is lifted or the crawler receives a force causing displacement or turning up. In other words, due to the space (clearance), the normal traveling is not disturbed while foreign objects such as sand which have entered the crawler are not accumulated therein. The rail and the inner attachments interfere with each other only in the event of detachment.

(4) Entry of foreign objects such as sand and snow into the crawler may push the crawler outward and cause it to slightly bulge. In the case of the straight rail, interference between the rail and the inner attachments is likely to be caused when the inner attachments enter the rail. In the present invention, the areas near both ends (entrance) of the rail are slightly open to allow the outer attachment to smoothly enter the rail.

(5) The crawler circulates while being restricted by the rail, thereby preventing detachment of the crawler even if the tension is reduced more than before.

(6) Providing the outer surfaces of the outer attachments and inner attachments which form the crawler with embossed grain patterns enables increase in the water repellency of the surfaces so that water droplets attached thereto would be dropped off as much as possible. This suppresses icing of the crawler and allows the crawler to get dried quickly when it gets wet.

The present invention aims to provide a high-quality crawler unit with the structure capable of achieving the objects described above, and a trolley for bad roads suitable therefor.

Solution to Problem

In order to solve the problems described above, the present invention provides a crawler unit, the crawler unit 5 comprising a crawler 1 that circulates around a plurality of pulleys 6, 60 rotatably attached to a frame 9, wherein the crawler 1 includes a plurality of inner attachments 3 provided inside thereof toward the frame 9 to have a band-shape, the crawler 1 is provided with: overhang edges 70, (70') of a rail 7 (7') provided on a circumference of the frame 9, the overhang edges 70, (70') protruding in a left and right direction of the rail 7 (7'); and overhang edges 34 (34') of each of the inner attachments 3, the overhang edges 34 (34') of each of the inner attachments 3 (3') protruding in a left and right direction of each of the inner attachments 3, in a space K or K' enclosed between the overhang edges 34 or 70' facing each other, the overhang edges 70 or 34' are inserted, the overhang edges 34 and 70 (34' and 70') are set in a positional relation in which they overlap with each other in an up and down direction, and the crawler 1 circulates around the pulleys 6, 60 while the inner attachments 3 (3') are restricted along the rail 7 (7').

In the crawler unit, wherein the crawler 1 includes a belt 4 provided with through holes 40 at predetermined positions and outer attachments 2, and the outer attachments 2 and the inner attachments 3 are combined to each other with the belt 4 being sandwiched therebetween through the through holes 40 in such a manner that the crawler with the plurality of inner attachments 3 provided inside thereof toward the frame 9 to have a band shape is formed.

In the crawler unit, wherein one of adjacent front and rear surfaces 20b, 20b' of the plurality of outer attachments 2 includes a restriction recess 20d (20d') and the other one of the adjacent front and rear surfaces 20b, 20b' includes a restriction projection 20c (20c'), and when the restriction projection 20c (20c') enters the restriction recess 20d (20d'), the outer attachments 2 are positioned and restricted to each other.

In the crawler unit, wherein the outer attachments 2 and/or the inner attachments 3, which form the crawler 1, include outer surfaces embossed with grain patterns P.

In the crawler unit, wherein a width W1 in a front and rear direction of each of the inner attachments 3 which are to be combined with each of the outer attachments 2 to form the crawler 1 having a band shape is set to be equal to or more than a width W2 of each of the outer attachments 2, and contact between the inner attachments 3 adjacent to each other in the front and rear direction causes contact between the outer attachments 2 adjacent to each other or a gap S between the outer attachments 2 adjacent to each other.

In the crawler unit, wherein the rail 7 is provided only at an outer peripheral bottom portion of the frame 9, and portions 71 near both ends of the rail 7 are curved and open in a downward direction.

In the crawler unit, provided is a trolley A for bad roads, comprising the crawler unit 5.

Advantageous Effects of Invention

According to the crawler unit of the present invention, the following advantageous effects can be obtained.

(a) In a state where ones of the overhang edges of the rail protruding in the left and right direction of the rail provided on the outer circumference of the frame and the overhang edges of each of the inner attachments protruding in the left and right direction of the inner attachments enter a space enclosed between the other ones of them facing each other, the crawler circulates around the pulleys while being restricted by the rail. This can reduce the tension of the crawler which has been necessary to be strong to prevent detachment of the crawler. The rotational load on the crawler is reduced, resulting in less conveyance load and improved traveling performance.

(b) In the case where a crawler unit (trolley) is manually swiveled, due to the force applied from the position of the handle of the trolley, the trolley cannot make pirouette turning (spin turning) that tanks can make, but is pulled off to the side. At this time, even a slightly uneven road surface may catch the crawler unit and cause detachment of the crawler unit, however, in the present invention, such detachment is prevented.

(c) Furthermore, a clearance provided between the rail and each of the inner attachments prevents foreign objects such as sand caught in the crawler unit from stopping or disturbing the rotation of the crawler.

(d) Still further, providing the outer surfaces of the outer and inner attachments with embossed grain patterns increases the water repellency of the surfaces so that water droplets are easily dropped off. This also suppresses icing of the crawler and allows the crawler to get dried quickly, and improves the convenience thereof.

DESCRIPTION OF EMBODIMENTS

Figure 1:
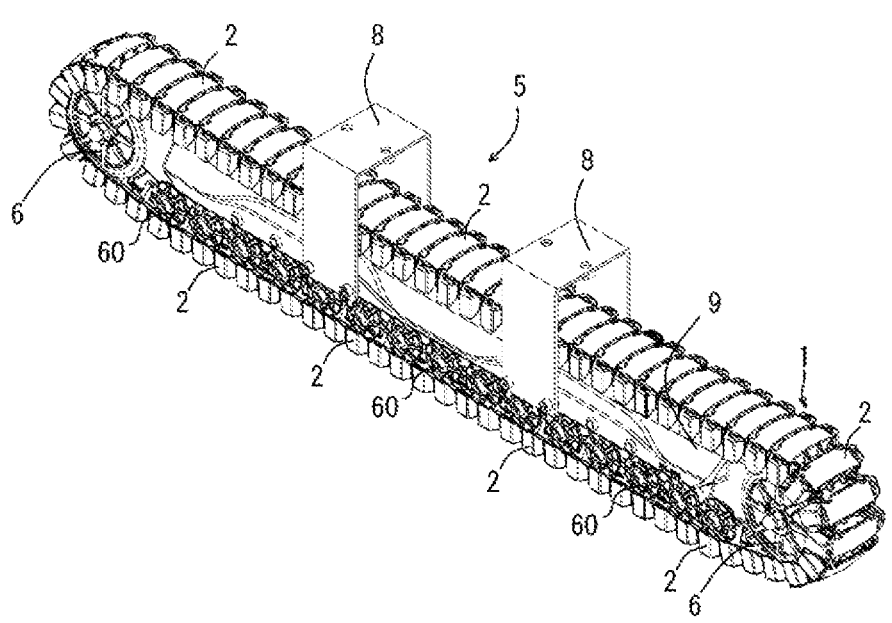
FIG. 1 is an overall perspective view of a crawler unit according to the present invention.

Hereinafter, an embodiment of a crawler unit according to the present invention as illustrated in the drawings will be described. A crawler unit 5 of the present embodiment includes a plurality of outer attachments 2 forming a band-shaped crawler 1, which are to be combined with inner attachments 3. One of the front and rear surfaces 20*b*, 20*b'* of the adjacent outer attachments 2 is provided with a restriction recess 20*d* and the like, and the other surface is provided with a restriction protrusion 20*c* and the like. When the restriction protrusion 20*c* and the like enters the restriction recess 20*d* and the like, the outer attachments 2, 2 are positioned and restricted so that they do not shift in the up and down direction. Then, the outer attachments 2, 2 smoothly circulate around pulleys 6, 60 while repeatedly engaging and disengaging with each other.

Figure 2:
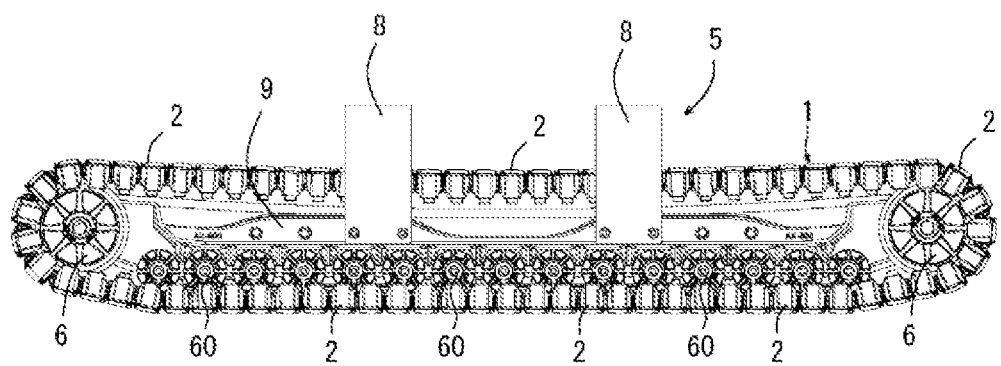
FIG. 2 is a side view of the crawler unit.
Figure 14:
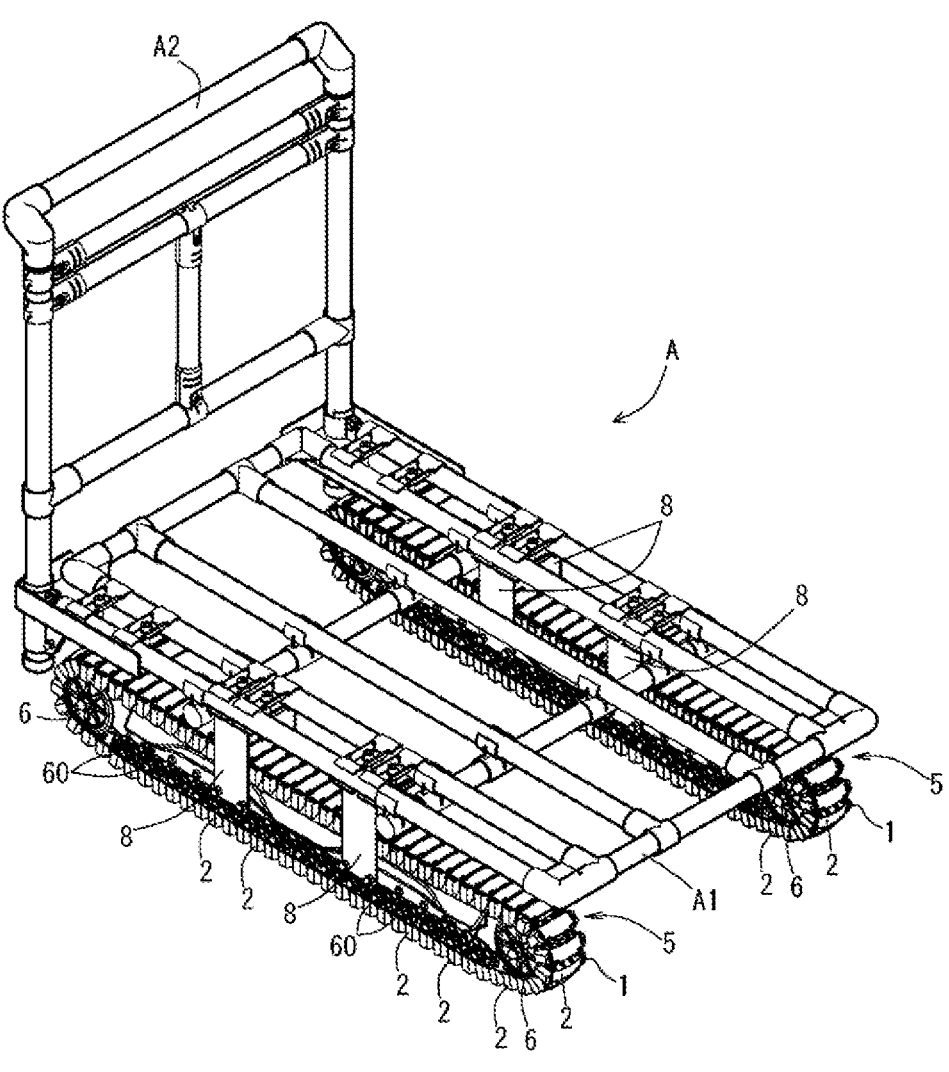
FIG. 14 is an overall perspective view of a trolley for bad roads to which the crawler unit is applied.

For example, the band-shaped crawler 1, which circulates around the plurality of small and large pulleys 6, 60 and is rotatably mounted on a frame 9 as illustrated in FIG. 1 and FIG. 2, is suitably mounted to, for example, a trolley A for bad roads as illustrated in FIG. 14, via amounting plate 8 having a flat surface provided on the frame 9. In the present embodiment, a lot of small pulleys 60 are provided between the pulleys 6, 6 positioned at both ends. However, as long as the pulleys 60, 60 are provided with intervals preventing the outer attachments 2 from being inserted therebetween, the number of pulleys can be less than those in the present embodiment to the extent that vibration and noise are acceptable.

Figure 3:
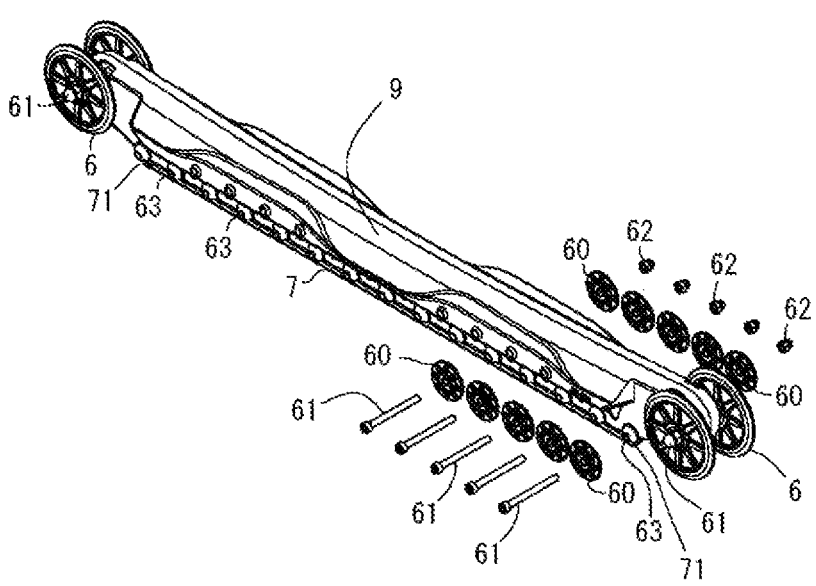
FIG. 3 is an exploded perspective view of a frame and pulleys of the crawler unit.
Figure 4A:
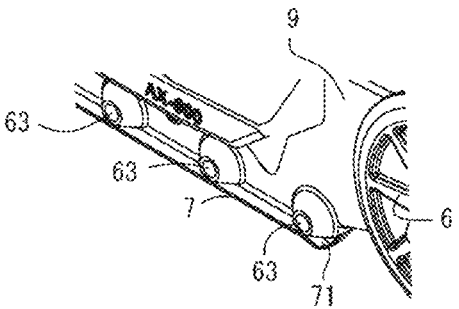
FIG. 4A is a partial perspective view of the pulley located near the end of the frame.
Figure 12:
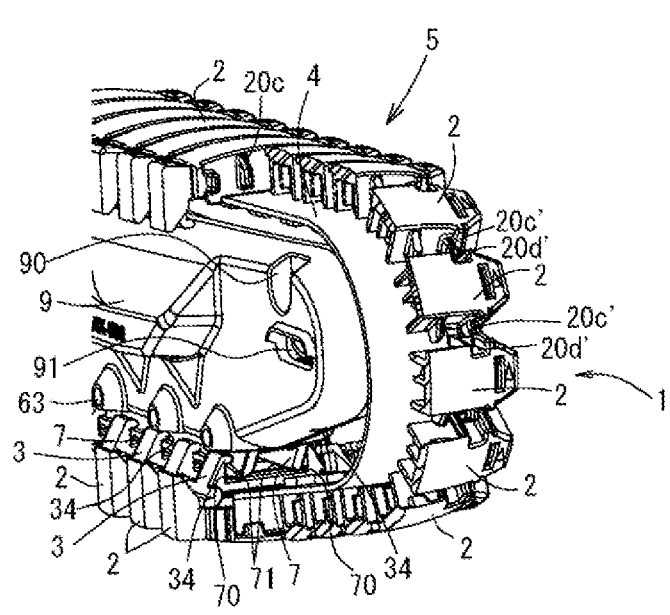
FIG. 12 is an enlarged perspective view of the rail and the corner of the crawler, omitting illustration of a pulley.

The frame 9 is long and narrow and has a half-cut shape, and as illustrated in FIG. 12, is fixed with bolts and nuts which are not illustrated, to bolt-fixing holes 90 provided on common positions at the ends so as to pass therethrough. At the lower end of the frame 9, as illustrated in FIG. 3 and FIG. 4A, a plurality of through holes 63 are provided therethrough at predetermined intervals so as to receive axles 61. The small pulleys 60 are rotatably fixed by the axles 61, which are inserted through the through holes 63, and nuts 62, which are at the other ends of the axles 61, respectively. The reference signs 91 in FIG. 12 indicate through holes extending along the longitudinal direction of the frame 9. Into these long through holes, the axles 61 of the large pulleys 6, 6 rotatably provided at both ends of the frame 9 around which the crawler 1 is wound are to be inserted, and shifting the positions of the axles 61 enables adjustment of the tension of the crawler 1.

Figure 10:
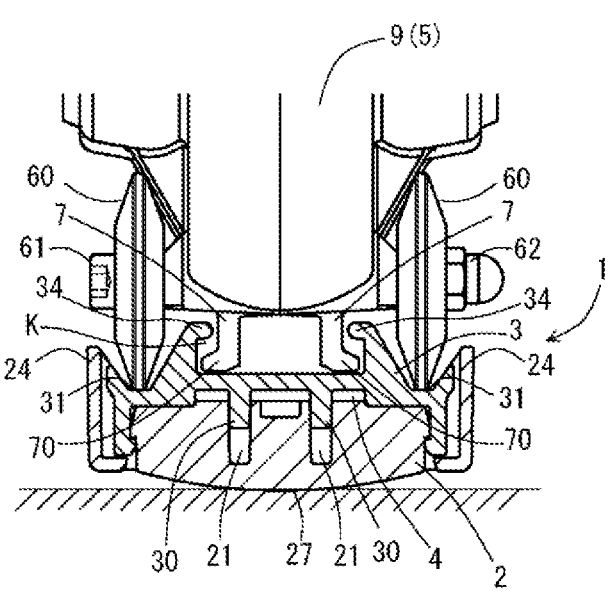
FIG. 10 is a front side enlarged cross-sectional view of both the overhang edges of the rail and the overhang edges of the inner attachment.

A rail 7 (overhang edges 70) is provided so as to protrude only at the outer peripheral bottom portion of the frame 9 so that the rail 7 and the overhang edges 34 of the inner attachments 3 are kept constrained with each other. As illustrated in FIG. 10, the basic structure of the lower end of the rail 7 is provided at the bottom (lower part) of the outer periphery of the frame 9, and the lower end portion is formed as the overhang edges 70 of the rail 7 which protrude in the left and right direction. In a space K enclosed between the overhang edges 34, 34 which face each other and protrude in the left and right direction of each of the inner attachments 3, the overhang edges 70, 70 of the rail 7 are inserted, and the overhang edges 34, 70 are set in the positional relation in which they overlap with each other in the up and down direction. The crawler 1 circulates around the pulleys 6, 60 while the inner attachments 3 are restricted along the rail 7.

When the crawler 1 is grounded while circulating, appropriate clearances are provided between the overhang edges 34, 70, thereby causing no interference therebetween. On the other hand, when the crawler unit 5 is lifted or the crawler 1 receives a force causing displacement in the left and right direction while swiveling, the overhang edges 34, 70 interfere with each other, thereby preventing detachment of the crawler 1. In the conventional crawler units, a belt is tensioned strongly to prevent the detachment. However, in the present invention, since there is no risk of detachment of the crawler 1 from the frame 9, the tension of the crawler 1 can be reduced, thereby realizing smooth circulation of the crawler 1 and thus improvement in the traveling performance thereof.

Figure 4B:
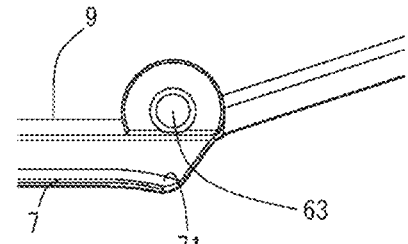
FIG. 4B is an enlarged side view of a rail structure near the end of the frame illustrated in FIG. 4A.
Figure 5:
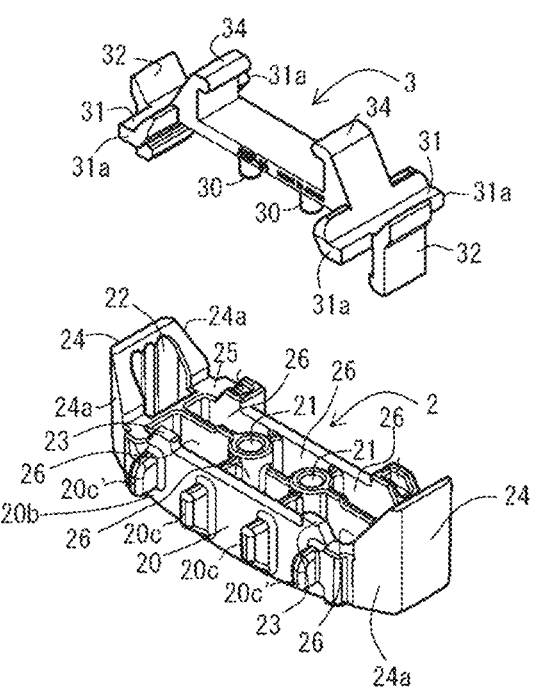
FIG. 5 is an exploded perspective view of an outer attachment and inner attachment, which form the crawler.

As illustrated in FIG. 4, areas near both ends of the rail 7 formed only at the bottom portion of the frame 9 are formed as curved ends 71 which are slightly open downward and curved. Forming the curved ends 71 enables the overhang edges 70 of the rail 7 to easily enter between the inner overhang edges 34, 34 provided at left and right of each of the inner attachments 3 even if the crawler 1 expands outward due to entry of foreign objects such as sand.

Figure 6:
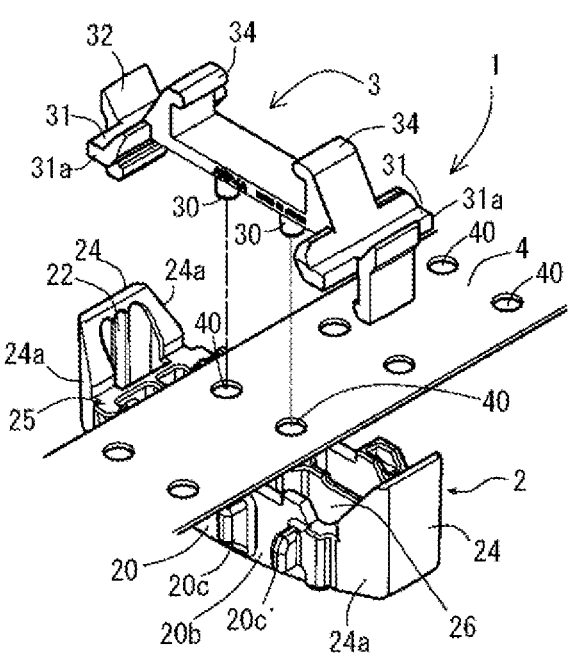
FIG. 6 is an exploded perspective view illustrating a state where the outer attachment and inner attachment illustrated in FIG. 5 are to be combined with a belt.
Figure 7:
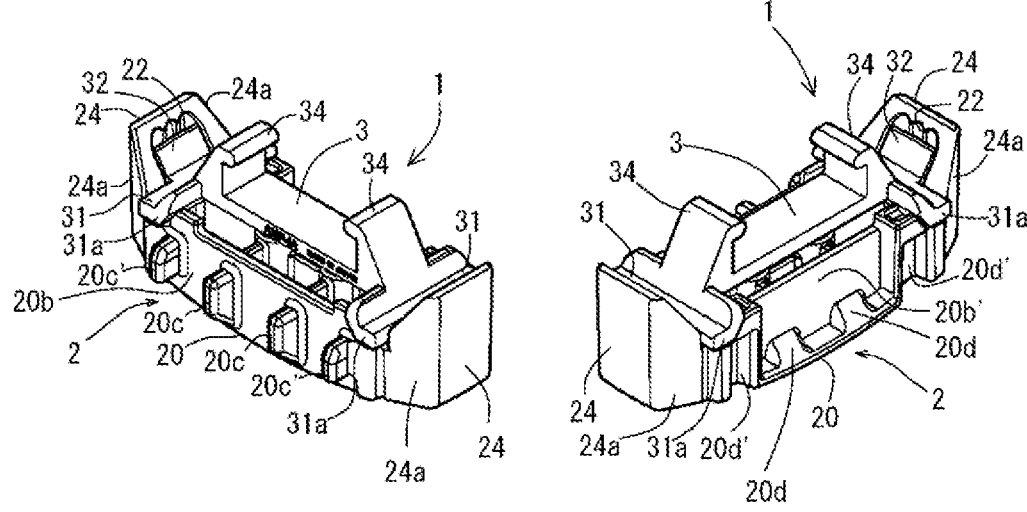
FIG. 7A is a front side perspective view and FIG. 7B is a rear side perspective view, both illustrating the combined state of the outer attachment and the inner attachment.

The crawler 1 includes the plurality of outer attachments 2, the plurality of the inner attachments 3, and one belt 4 provided with through holes 40 at predetermined positions. As illustrated in FIG. 6, one of the outer attachments 2 placed at the outer side and one of the inner attachments 3 placed at the inner side are combined to each other, as one pair, with the belt 4 being sandwiched therebetween via the through holes 40. The crawler 1 is formed by multiple pairs of them which are consecutively provided to form a band-shape.

Considering the possibility that the outer attachments 2 and the inner attachments 3 would contact the ground which may be under various conditions, as materials thereof, engineering plastic which has a relatively low coefficient of friction, high rigidity to prevent from being whittled, and excels in mechanical strength is selected, and thus they are molded products either of PA resin, glass-filled PA resin, PBT resin, glass-filled PBT resin, POM resin, or glass-filled POM resin.

In the present embodiment, the outer attachments 2 are provided, however, in other embodiments, only the inner attachments 3 integrated with the outer attachments 2 may be provided (detailed explanation is omitted).

The belt 4 is always under tension, and thus is formed by a woven flat belt and the like which is hardly to be elongated, excels in dimensional stability, and can be easily bended. The belt 4 is formed to be an endless belt obtained by cutting a long and band-shaped belt to the length allowing it to be wound around the total length of the crawler and then fixing both ends thereof. The belt 4 is flexible enough to be adjusted to the size of the desired crawler unit 5, and in the present embodiment, includes the through holes 40 provided in parallel two by two at predetermined intervals of 25 mm throughout the entire belt. However, in other embodiments, the through holes 40 may be provided one by one at the predetermined intervals (not illustrated).

Next, the structure of each of the inner attachments 3 will be described.

As illustrated in FIG. 5 to FIG. 8, each of the inner attachments 3 according to the present embodiment is formed into H-shape in planar view, and advantageously includes the overhang edges 34 which interfere with the overhang edges 70 of the rail 7 of the frame 9 as described above, and also includes side pieces 31, 31 that are provided on the left and right of each of the inner attachments 3 and have top surfaces on which the pulleys 6, 60 rotate.

Figure 9:
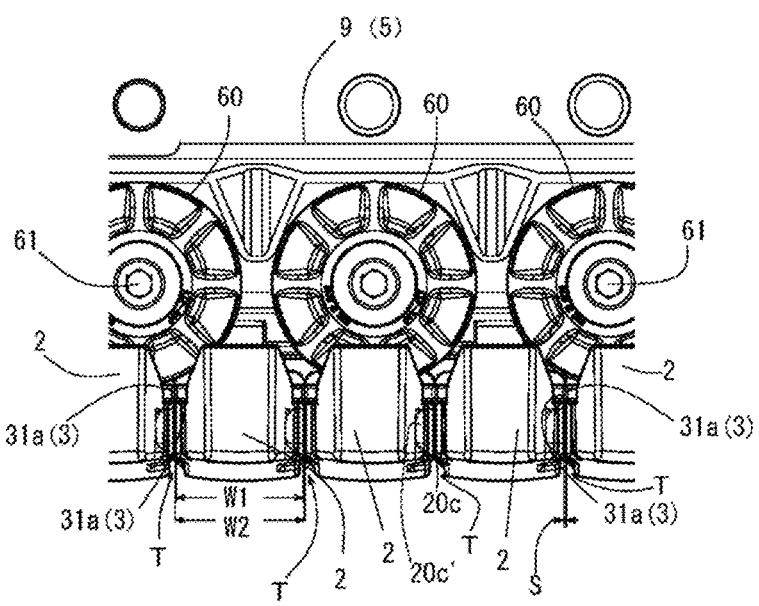
FIG. 9 is an enlarged and simplified side view partially illustrating an action of the crawler during traveling on the flat road.

Each of the inner attachments 3 includes a pair of locking pieces 32, 32 provided at both ends thereof and protruding vertically downward, and a distance between the pair of the locking pieces 32, 32 is set to a width dimension sufficient to cover the belt 4 from above. As described later, the locking pieces 32 are inserted into locking holes 22, which are provided in the side portions 24 of each of the outer attachments 2 by hollowing out, from above, the side portions 24 to have corrugated outer edges, so that they are firmly locked therewith. Inside each of the inner attachments 3 between the locking pieces 32, 32, two projections 30 that extend downward and are to be inserted into the holes 40 of the belt 4 are provided. The side pieces 31, 31, which are provided immediately inside the locking pieces 32, 32 in the left and right direction and have straight flat surfaces extending in the front and rear direction so that a width W1 of each of the inner attachments 3 in the front and back direction is, as illustrated in FIG. 9, equal to or more than a width W2 of each of the outer attachments 2, include contact side portions 31a, 31a, respectively. The contact side portions 31a, 31a are provided at both ends in the front and rear direction of the side pieces 31, 31. The crawler 1 circulates while the pulleys 6, 60 step and rotate on the top surfaces of the left and right side pieces 31, 31, respectively. If a gap S is provided between the inner attachments 3, 3, which are adjacent to each other in the front and rear direction, the pulleys 6, 60 fall into the gap S and collides therein, causing noise such as rattling. In order to prevent this, firstly bringing the inner attachment 3 into contact with the adjacent inner attachment 3 causes a consecutive top surface with no gap S to be formed between the side pieces 31. This enables the pulleys 6, 60 to step on the top surface with no gap, thereby suppressing generation of noise. Thus, in the case where each of the outer attachments 2 has the width W1 which is the same as that of each of the inner attachments 3, the outer attachments 2 are in contact with each other while in the case where each of the outer attachments 2 has the width W2 which is smaller than the width W1 of each of the inner attachment 3, the gap S is provided between the adjacent outer attachments 2 and such a structure advantageously prevents water, sand, and the like from accumulating in the restriction recesses of the outer attachments 2.

The bodies of each of the inner attachments 3 stand immediately inside the center lines of the side pieces 31, 31 provided on the left and right thereof. On the top ends of the bodies, the overhang edges 34, 34 of each of the inner attachments 3 facing each other and protruding inwardly in the left and right direction are provided, and the space K enclosed between the overhang edges 34, 34 is formed (see FIG. 10). Due to the dimension between the overhang edges 34, 34 of each of the inner attachments 3, the space K can accommodate the interval between the overhang edges 70, 70 of the rail 7. The space K has such a sufficient clearance that the crawler 1 circulates around the pulleys 6, 60 while the inner attachments 3 are restricted along the rail 7. Thus, even if the crawler unit 5 is lifted or the crawler 1 receives a force causing displacement or turning up, the overhang edges 34 of each of the inner attachments 3 and the overhang edges 70 of the rail 7 interfere with each other, thereby effectively preventing detachment of the crawler 1.

Furthermore, the projections 30 of each of the inner attachments 3 described above pass through the through holes 40 of the belt 4 and fit into inner locking holes 21, which will be described later, of each of the outer attachments 2, respectively. In addition, the locking pieces 32 provided at both ends of each of the inner attachments 3 are locked by the locking holes 22 of each of the outer attachments 2, respectively. Thus, each of the lower outer attachments 2 on the outer periphery side and each of the upper inner attachments 3 on the inner side are combined to each other with the belt 4 sandwiched therebetween. The multiple pairs of the outer attachments 2 and the inner attachments 3, each combined as described above, are provided in the shape of a band so as to fill the belt 4 (see FIG. 12).

FIG. 13 illustrates an example of the inner attachments 3'. In this example, the above-described overhang edges 34, 70 face opposite, respectively.

Figure 13A:
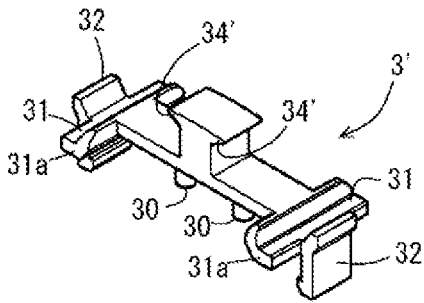
FIG. 13A is a perspective view of another inner attachment.

That is, as illustrated in FIG. 13A, in each of the inner attachments 3', overhang edges 34', 34' protruding outward in the left and right direction are provided on the top end of a single body which stands at the center thereof. On the other hand, the bottom end of the rail 7' is formed to be overhang edges 70', 70' of the rail 7', which protrude inward in the left and right direction, respectively, and a space K' is formed between the overhang edges 70', 70' (see FIG. 13B). The overhang edges 34', 34' of each of the inner attachments 3' are inserted into the space K' enclosed between the overhang edges 70', 70', which face each other, of the rail 7', and thus the overhang edges 70', 34' are set in the positional relation in which they overlap with each other in the up and down direction. The crawler 1 circulates around the pulleys 6, 60 while the inner attachments 3' are restricted along the rail 7.

Next, the structure of each of the outer attachments 2 will be described (see FIG. 5 to FIG. 8).

Each of the outer attachments 2 has a boat-shape as whole, and includes a base 20 which is the main part of each of the outer attachments 2 and the side portions 24, 24 which protrude from both ends of the base 20. The side portions 24 are formed to have corner portions 24a where each corner is cut to provide a space between adjacent outer attachments 2 as well as reduce the weight. The side portions 24 are formed in a trapezoidal shape in plan view. In the central region of the base 20, the two inner locking holes 21, 21 are provided at the positions corresponding to the parallel-arranged through holes 40, 40 of the belt 4.

The base 20 is provided with a lightening portion 26 for lightening. The lightening portion 26 is formed by hollowing out the base 20 from the top surface by the extent that does not affect the strength (rigidity) so as to reduce the weight. In other words, the base 20 is deeply hollowed out from the top so as to define the base 20 into six zones, except the two inner locking holes 21, 21 into which the above-described two projections 30, 30 provided inside the H-shaped outer attachment 3 are fit. This reduces the area of contact with which the contact surface of the belt 4 is contact, and also increases the pressure.

The locking holes 22, 22 are positioned inside of each of the outer attachments 2 at the outer edge side between the side portions 24, 24 provided at both ends, respectively. The locking holes 22, 22 are formed by hollowing out, from above, sloping portions of the side portions 24 to have corrugated outer edges so that the vertical locking pieces 32 of each of the H-shaped inner attachments 3 can be inserted thereinto, thereby increasing the locking force and facilitating insertion.

In addition, a top surface protrusion 23 is formed between the inner locking hole 21 and the side portion 24 of the base 20. The top surface protrusion 23 slopes toward the side portion 24 and is connected to the outer recess portion 25. The outer recess portion 25 is formed with the portion of the top surface protrusion 23 which is closer to the side portion 24 and the slope of the side portion 24, and is a concave into which the side pieces 31 of each of the H-shaped attachments 3 fits.

The distance between the side portions 24, 24 protruding at both ends is wide (in the present embodiment, about 52 mm) enough to accommodate the pulleys 6, 60 arranged in the left and right direction and attached to the main body of the crawler unit 5, which thus allows them to rotate thereon (see FIG. 10). More specifically, the pulleys 60, 60 stably rotate on the side pieces 31, 31 of each of the inner attachments 3, which are positioned immediately inside the side portions 24 with each of the outer attachments 2 and each of the inner attachments 3 being combined to each other (see FIG. 7, FIG. 10, FIG. 11, FIG. 13B).

Figure 13B:
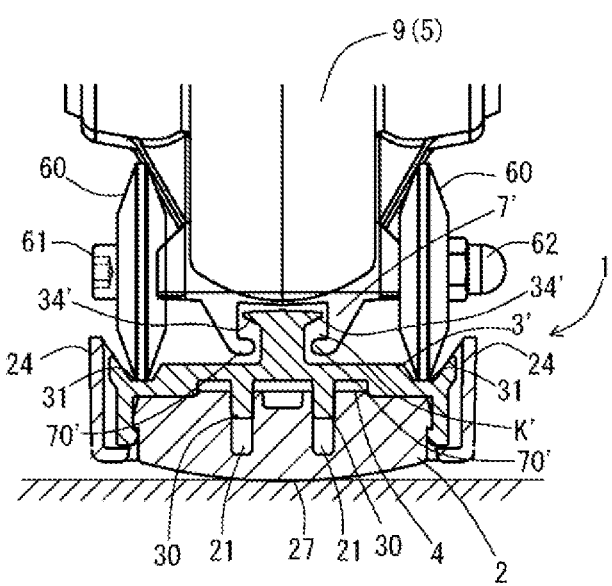
FIG. 13B is a front side enlarged cross-sectional view of overhang edges of the inner attachment illustrated in FIG. 13A.

Furthermore, a ground contact surface 27 of each of the outer attachments 2 is formed in a curved shape with its center slightly bulging downward (see FIG. 10 and FIG. 13B). This reduces ground resistance of the crawler 1 attached to a hand-pushed trolley A for bad roads and improves the swiveling performance.

The rear surface 20b of the base 20 of each of the outer attachments is provided with the plurality of restriction projections 20c (20c'), and the front surface 20b' of the base 20 is provided with the plurality of restriction recesses 20d (20d'). More specifically, the total of four restriction projections 20c (20c') are provided such that the two projections 20c, 20c are positioned at the inner positions of the rear surface 20b (side surface) of the base 20 while the other two projections 20c', 20c' are provided at the outer positions, respectively. The front surface 20b' (side surface) of the base 20 includes the inner restriction recesses 20d which are recessed with depth and width sufficient to receive the two inner restriction projections 20c, 20c, and also includes the outer two restriction recesses 20d', 20d' which are provided on the positions corresponding to the two outer restriction projections 20c', 20c' to receive them. The restriction recesses 20d (20d') and the restriction projections 20c (20c') are positioned and restricted in the positional relation in which they are in contact with each other in the up and down direction so as to prevent them from moving to each other. Note that the front surface 20b' may include the restriction projections 20c (20c') and the rear surface 20b may include the restriction recesses 20d (20d').

Thus, the restriction recesses 20d (20d') of one of the two adjacent outer attachments 2, 2 receive the restriction projections 20c (20c') of the other one of the adjacent outer attachments 2, 2, and the displacement in the up and down direction between the two outer attachments 2, 2 is thus restricted, thereby preventing detachment of the inner attachments 3 during traveling. Needless to say, the restriction projections 20c (20c') and the restriction recesses 20d (20d') may be set to have the size and positional relation which allow them to be in contact with each other in the left and right direction as well so as to restrict not only the displacement in the up and down direction but also the displacement in the left and right direction (see the relation between the restriction projections 20c' and the restriction recesses 20d' illustrated in FIG. 12).

Figure 11:
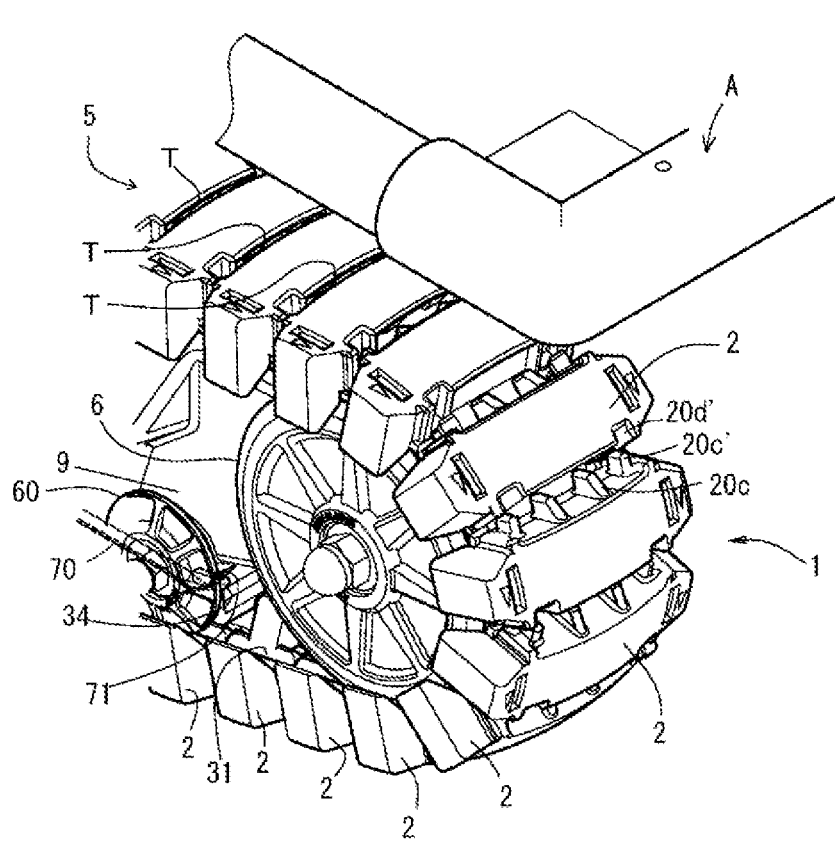
FIG. 11 is an enlarged perspective view illustrating an action of the outer attachment during rotating on the corner.

That is, when the restriction recesses 20d (20d') of the rear surface 20b or front surface 20b' of the base 20 receive the restriction protrusions 20c (20c'), they are in contact with each other on each of the upper and lower surfaces of the front and rear surfaces 20b, 20b' so that the movement of the adjacent outer attachments 2, 2 in the up and down direction is restricted. In this structure, when being in contact with the ground, the crawler 1 is rigid and consecutively straight as whole in the horizontal direction and not bended (see FIG. 1 and FIG. 9). On the other hand, when being along the circumferences of the pulleys 6, as illustrated in FIG. 11 and FIG. 12, since the restriction protrusions 20c (20c') and the restriction recesses 20d (20d') move in the direction for opening and thus the restriction protrusions 20c (20c') do not enter the restriction recesses 20d (20d'), the restriction is removed and the crawler 1 can bend.

Furthermore, a clearance T between the bottoms of the outer attachments 2 is generated (see FIG. 9 and FIG. 11) when the restriction protrusions of the rear surface 20b enter the restriction recesses of the adjacent front side 20b', and the clearance T prevents the sand or the like which has entered the restriction recesses during use from being accumulated therein.

Figure 8:
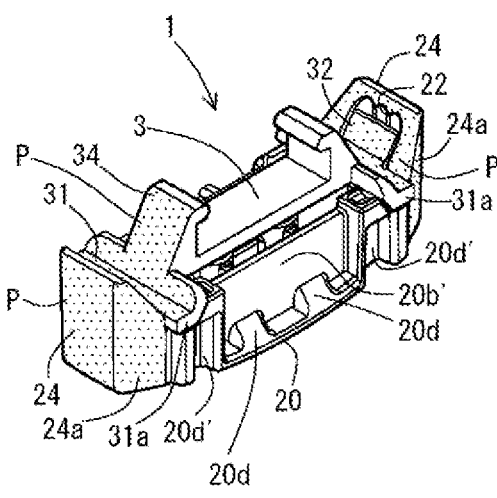
FIG. 8 is a perspective view of the outer attachment and the inner attachment which are provided with grain patterns.

Preferably, the outer surfaces of the outer attachments 2 and inner attachments 3 (3') are embossed with grain patterns P as illustrated with dots in FIG. 8. Providing the grain patterns P enables increase in the water repellency of the surfaces so that water droplets are easily dropped off. This also suppresses icing of the crawler 1 and allows the crawler 1 to get dried quickly, and improves the appearance thereof.

FIG. 14 illustrates a trolley A for bad roads including the crawler unit 5 described above. In FIG. 14, the reference sign A1 indicates a pipe-structured mounting platform installed on the top surface of the mounting plate 8 of the crawler unit 5 (crawler 1), and the reference sign A2 indicates a handle. The trolley A can be adapted to the roads whose conditions are bad, such as snow-covered road surfaces, soft road surfaces such as soil, and uneven road surfaces.

In the above, the embodiments have been described based on the drawings, however, the present invention is not limited to the examples illustrated in the drawings. It should be noted that the present invention may be modified in view of ordinary change of design or implemented in other various ways by those skilled in the art without departing from the spirit and scope of the invention.

REFERENCE SIGNS LIST 1 crawler
2 outer attachment
20 base
20b rear surface
20b' front surface
20c restriction projection (inner side)
20c' restriction projection (outer side)
20d restriction recess (inner side)
20d' restriction recess (outer side)
21 inner locking hole
22 locking hole
23 top surface protrusion
24 side portion
24a corner portion
25 outer recess portion
26 lightening portion
27 ground contact surface
3, 3' inner attachment 30 projection
31 side piece
31*a* contact side portion
32 locking piece
34, 34' overhang edge
4 belt
40 through hole
5 crawler unit
6 pulley (both ends)
60 pulley (small sized)
61 axle
62 nut
63 through hole
7, 7' rail
70, 70' overhang edge
71 curved end
8 mounting plate
9 frame
P grain pattern
K, K' space
S gap
W1, W2 width
A trolley for bad road

The invention claimed is:

1. A crawler unit comprising a crawler that circulates around a plurality of pulleys rotatably attached to a frame, wherein the crawler includes a plurality of inner attachments provided inside thereof toward the frame to have a band-shape, the crawler unit is provided with:

a pair of overhang edges of a rail provided on a circumference of the frame, the overhang edges of the rail protruding in a left and right direction of the rail; and a pair of overhang edges of each of the inner attachments, the overhang edges of each of the inner attachments protruding from an outside of the pair of overhang edges of the rail in a left and right direction of each of the inner attachments, in a space enclosed by the pair of overhang edges of each of the inner attachments the pair of overhang edges of the rail are inserted, the pair of the overhang edges of the rail and the pair of the overhang edges of each of the inner attachments are set in a positional relation in which the pair of overhang edges of the rail and the pair of overhang edges of the inner attachments overlap with each other in an up and down direction, and the crawler circulates around the pulleys while the inner attachments are restricted along the rail, wherein the rail is provided only at an outer peripheral bottom portion of the frame, and portions near both ends of the rail are curved and open in a downward direction.

2. The crawler unit according to claim 1, wherein the crawler includes a belt provided with through holes at predetermined positions and outer attachments, and the outer attachments and the inner attachments are combined to each other with the belt being sandwiched therebetween through the through holes in such a manner that the crawler with the plurality of inner attachments provided inside thereof toward the frame to have the band-shape is formed.

3. The crawler unit according to claim 2, wherein one of adjacent front and rear surfaces of the plurality of outer attachments includes a restriction recess and the other one of the adjacent front and rear surfaces includes a restriction projection, and when the restriction projection enters the restriction recess, the outer attachments are positioned and restricted to each other.

4. The crawler unit according to claim 1, wherein a width in a front and rear direction of each of the inner attachments which are to be combined with each of outer attachments to form the crawler having the band-shape is set to be equal to or more than a width of each of the outer attachments, and contact between the inner attachments adjacent to each other in the front and rear direction causes contact between the outer attachments adjacent to each other or a gap between the outer attachments adjacent to each other.

5. A trolley for bad roads, comprising the crawler unit according to claim 1.

* * * * *